United States Patent [19]
Grewer et al.

[11] Patent Number: 5,926,165
[45] Date of Patent: Jul. 20, 1999

[54] METHOD AND DEVICE FOR THE DISPLAY OF IMAGES FROM A GROUP OF IMAGES

[75] Inventors: Rudiger Grewer, Schenefeld; Karl-Jürgen Mönnich, Wedel; Joachim Schmidt; Thomas Wendler, both of Hamburg, all of Germany

[73] Assignee: U.S. Philips Corporation, New York, N.Y.

[21] Appl. No.: 08/875,164
[22] PCT Filed: Nov. 18, 1996
[86] PCT No.: PCT/IB96/01242
§ 371 Date: Sep. 15, 1997
§ 102(e) Date: Sep. 15, 1997
[87] PCT Pub. No.: WO97/19399
PCT Pub. Date: May 29, 1997

[30] Foreign Application Priority Data

Nov. 21, 1995 [DE] Germany ............................ 195 43 377

[51] Int. Cl.⁶ ........................................ G09G 5/00
[52] U.S. Cl. .............................................. 345/115
[58] Field of Search ................................ 345/115, 112, 345/121, 127, 116

[56] References Cited

U.S. PATENT DOCUMENTS

| | | | |
|---|---|---|---|
| 5,073,771 | 12/1991 | Satta et al. ............................. | 340/721 |
| 5,298,890 | 3/1994 | Kanamaru et al. ..................... | 345/157 |
| 5,334,994 | 8/1994 | Takagi .................................... | 345/127 |
| 5,500,654 | 3/1996 | Fujimoto ................................ | 345/132 |
| 5,583,538 | 12/1996 | Watanabe et al. ....................... | 345/121 |

FOREIGN PATENT DOCUMENTS 2237486  9/1990  United Kingdom ............ G06F 3/033

*Primary Examiner*—Mark K. Zimmerman
*Assistant Examiner*—Ronald Laneau
*Attorney, Agent, or Firm*—Dwight H. Renfrew, Jr.

[57] ABSTRACT

For the display of images, notably X-ray images, the complete image of full resolution, usually consisting of a group of images, may be substantially larger than the size that can be reproduced on a display screen. In accordance with the invention, the overall group of images is displayed on the display screen as an auxiliary image in a strongly reduced scale, the size of the auxiliary image being dependent on the group of images. Via a frame which is reproduced in the auxiliary image and whose dimensions and position can be varied, a part of the group of images, i.e. one image or separate neighboring images, is selected and displayed on the overall display screen. When the frame is shifted in the auxiliary image, the part of the overall group of images which is displayed on the display screen is also automatically shifted. The images reproduced in the auxiliary image can be shifted and modified, for example rotated or enlarged or reduced, and any modification of an image situated within the frame is reproduced directly on the overall display screen. The overall view of the entire group of images is thus always preserved.

19 Claims, 2 Drawing Sheets

METHOD AND DEVICE FOR THE DISPLAY OF IMAGES FROM A GROUP OF IMAGES

The invention relates to the display of one or more neighboring images or sub-groups of images as a part of a larger group of images wherefrom the image or images to be displayed can be selected.

A need for such a type of display exists, for example in the medical field, notably if a selection of images from among a plurality of X-ray images showing, for example the development of a diseased area of a patient over a given period of time, is to be reproduced more clearly, i.e. with an increase in scale. Basically, it is not problematic to select a single image or several neighboring images from a plurality of images and to display these images completely on a display screen or, in the case of a single large image instead of the group of images, to zoom or enlarge a detail, notably if the image data for the group of images or the large image enable a high resolution. However, once the selected or enlarged display has been realized, the overall view of the group of images or the large image will be lost and in order to regain this overall view, the entire group of images or the large image should then be displayed again in order to enable individual images or a part to be selected therefrom again. This is very unattractive with a view to ease of operation.

It is an object of the invention to provide a method and a device which enable individual images or sub-groups of images or a part of an image to be selected simply and distinctly from a group of images, which may also consist of one large image, and also enable a fast and distinct change over to other images or sub-groups of images or parts of an image.

This object is achieved according to the invention by means of the method disclosed in claim 1 and the device disclosed in claim 6.

Thus, an auxiliary image which occupies only a small part of the screen surface area is displayed on the display screen and the entire group of images, or the large image, is reproduced in the auxiliary image at a strongly reduced scale. This auxiliary image is permanently preserved, thus occupying a small part of the display screen or one display screen, but the overall view of the entire group of images is thus permanently maintained. The size of the auxiliary image is dependent on the magnitude, i.e. the size of the group of images. When additional images are included in the group of images, the auxiliary image will become larger because the scale of reduction is effectively maintained constant. A frame is reproduced in the auxiliary image and the part which is situated within a frame reproduced in the auxiliary image is displayed completely on the display screen, be it that a small part thereof is masked by the auxiliary image. The position and the dimensions of the frame reproduced can be shifted and enlarged or reduced, respectively, via a keyboard or a so-called mouse, and the part of the auxiliary image which is situated within the frame is always automatically displayed on the display screen. The auxiliary image constitutes as if it were a virtual display screen wherefrom the real display screen is automatically selected by the frame. Because of the permanent display of the auxiliary image, however, the overall view of the entire group of images or the large image will be preserved.

It is to be noted that use can also be made of a plurality of closely adjacent display screens which together constitute a logic display surface, different parts of the image to be displayed then being reproduced on different display screens. The auxiliary image is then displayed on one of the display screens only. The window reproduced in the auxiliary image may also contain a plurality of images or sub-groups of images; in this case preferably one of the images contained in the window, or one of the sub-groups of images, is displayed on each of the plurality of display screens.

Preferably, the magnitude of the group of images wherefrom the part is selected can be changed by including further images or sub-groups or by erasing images present. The size of the auxiliary image then changes accordingly, so that the auxiliary image will always be only as large as necessary for the overall group of images. The inclusion of additional images or sub-groups does not change the display of the instantaneously displayed frame and the partial image on the display screen. Merely further memory locations of the memory directly associated with the display screen are filled with the additional reduced images or image areas.

The dimensions and the position of the frame are changed, for example by actuation of keys of a keyboard or via a so-called mouse. The position and the dimensions of the frame in the auxiliary image can in principle be chosen at random. For ease of operation, notably to enable fast and accurate selection of one or more neighboring images, the dimensions of the frame and its position can preferably be changed only in given, rather large steps which comprise a plurality of pixels. The adjustment of the frame to, for example a given image is thus facilitated.

The image or the group of images is always present with a given, high resolution which is strongly reduced for the reproduction in the auxiliary image. This image reduction is preferably performed by averaging over image data of a number of neighboring pixels. Thus, the image is displayed on the display screen with a resolution which is equal to or lower than that of the image, depending on the dimensions of the frame in the auxiliary image. Enlarged reproduction may also be desirable in case the frame is chosen to be very small. In the case of a slight reduction, for example weighted averaging over neighboring pixels may be performed, whereas enlargement can be realized by a given interpolation.

When the image or the sub-group of images to be displayed is selected from a group of images reproduced in the auxiliary image, the images are reproduced in the auxiliary image according to a given order which is dependent on properties or attributes of the sub-images. For example, X-ray images of different parts of the body of a patient may be ordered according to the individual body parts. Upon evaluation of the images by a physician, however, it may appear that a different order is more effective, for example an order of the images according to age. Therefore, the order and/or the reproduction of images in the auxiliary image can preferably be selected by third control instructions entered. The physician evaluating the images can then easily modify the order of the images in the auxiliary image if this appears to be necessary during evaluation. Furthermore, images in the auxiliary image can preferably be shifted by means of control instructions applied notably via a mouse. For example, an image can thus be shifted into the area enclosed by the frame reproduced, so that it is automatically displayed. This possibility is particularly attractive if one or more sub-groups of images are situated within the frame and individual images are moved independently of one another, in which case the sub-group need not always be completely filled with the images. In addition to the possibility of shifting, individual images of the images reproduced in the auxiliary image themselves can preferably be changed, for example by enlargement or reduction, changing of the orientation, i.e. rotation, mirroring, or also in respect of halftone reproduction in that small halftone differences in given halftone ranges are increased. Such image manipulations are known in principle. In the context of the present invention Such manipulations can be applied to the images in the auxiliary image, each such manipulation also appearing automatically in the images reproduced full size on the entire display screen or the display screens, or, conversely, can be applied directly to these images, the corresponding images in the auxiliary image then being changed in the same way.

The invention also relates to a device for the display of images from a group of images, including at least one display screen, a first memory for the image data to be displayed, a control unit for converting this data into image control signals, a second memory for storing the data of the entire group of images, and a processing device which transfers the image from the second memory to the first memory in reduced form and processes the frame data entered.

Embodiments of the invention will be described in detail hereinafter with reference to the drawing. Therein:

Figure 1:
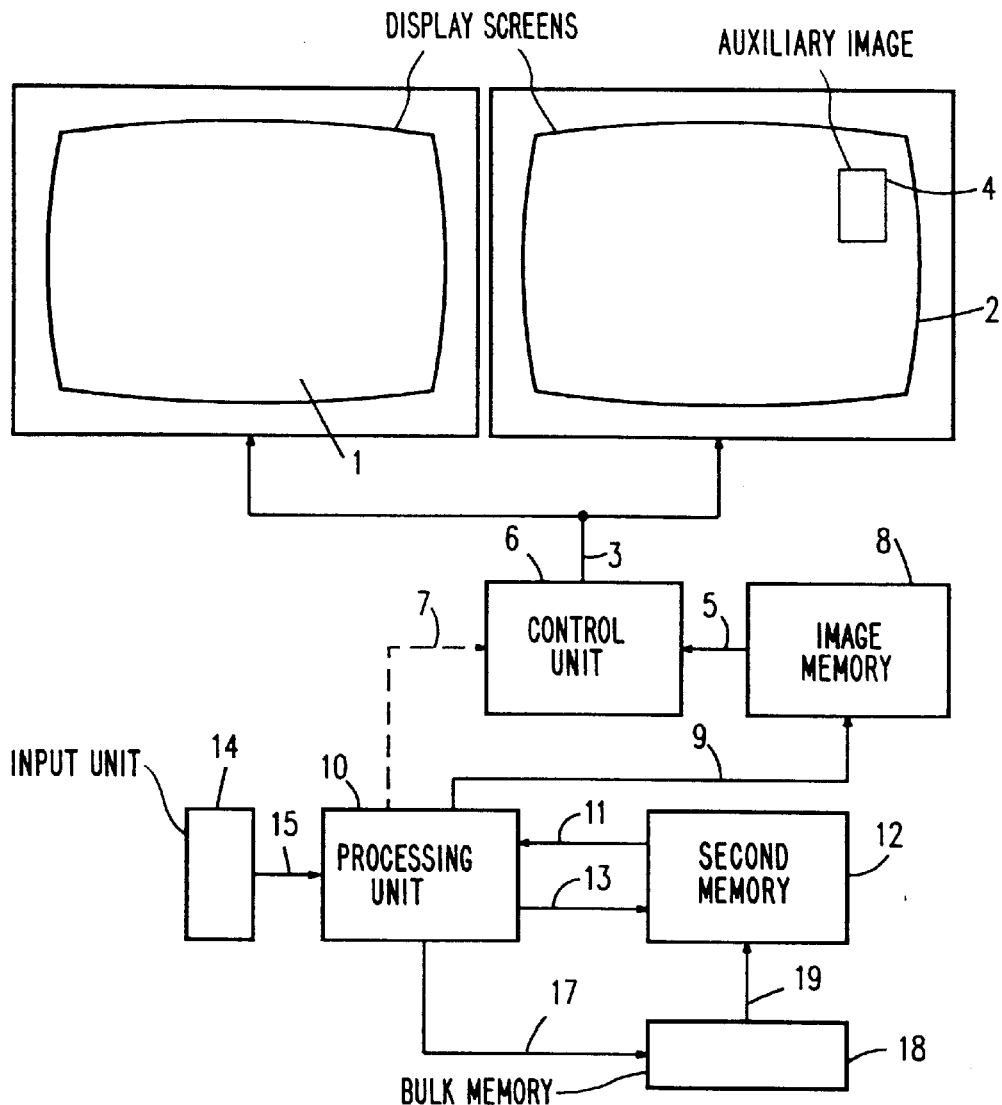
FIG. 1 shows a block diagram of a device according to the invention.

FIG. 1 shows two adjacently arranged display screens 1 and 2 which together constitute a logic display surface on which images (not shown) and an auxiliary image 4 are displayed. The display screens 1 and 2 receive the data for the image to be displayed, via the connection 3, from a control unit 6 which receives image data from an image memory 8, via the connection 5, and converts this data into drive signals on the connection 3. Depending on the size of the individual images, one or more images can be displayed on each of the display screens.

Via the connection 9, the image memory 8 receives the image data corresponding to the image to be displayed with the auxiliary image from a processing unit 10 which communicates, via connections 11 and 13, with a second memory 12 which contains the image data of a group of images. Via the connection 15, the processing unit 10 also receives control instructions from an input unit 14, for example a keyboard or a so-called mouse or a combination thereof. In response to given instructions issued, the processing unit 10 addresses the memory 12, via the connection 13, and reads its content via the connection 11. From the image data read there is formed, preferably by averaging of data of neighboring pixels, new image data for a reduced auxiliary image which is applied, via the connection 9, to the image memory 8 in which it is written in given memory locations which correspond to the position of the auxiliary image 4 on the display screen 2. These memory locations are determined by corresponding control instructions given via the input device, so that the position of the auxiliary image 4 on the display screen 2 can be adjusted at random. The auxiliary image 4 is displayed on one of the display screens only.

Moreover, the processing unit 10 generates frame data for a window to be reproduced in the auxiliary image 4, which data is either written into the image memory 8, via the connection 9, or applied to the control unit 6, via the dashed connection 7, in order to enter this frame data directly into the auxiliary image displayed. The frame preferably has a rectangular shape, like the display screens on which the images present within the frame are displayed. The dimensions and the position of the frame within the auxiliary image can be changed by application of control instructions from the input unit 14 to the window data. The image data of the memory 12 which is associated with pixels within the frame is also converted into image data for the image memory 8 by the processing unit 10 and written into said image memory, i.e. at all memory locations for the overall display screen 1, 2, with the exception of the memory locations for the auxiliary image 4. However, the processing unit can instead transfer all data for the image or sub-image to be displayed on the display screen to the memory 8, after which this data is overwritten by the data for the auxiliary image 4.

The position of a point of the auxiliary image 4, for example the top left-hand corner, on the display screen 2 is defined by control instructions applied to the processing unit 10 by the user, via the input unit 14, whereas the size of the auxiliary image 4 is dependent on the magnitude of the group of images stored in the memory 12. Via appropriate control instructions from the input unit 14, further image data can be transferred from a bulk memory 18 to the memory 12 in order to enlarge the overall group of images. The auxiliary image 4 on the display screen is then also enlarged accordingly. It is also possible to erase images in the group of images, so that the auxiliary image 4 becomes smaller.

The dimensions and the position of the frame in the auxiliary image 4 can also be changed by way of control instructions from the input unit 14. Accordingly other data, associated with other pixels, is then read from the memory 12, via the connection 11, and converted into image data for the memory 8. The dimensions of the frame reproduced in the auxiliary image 4 are preferably chosen so that the corresponding image or the corresponding images from the group of images in the memory 12 are displayed with full resolution, the processing unit conducting the image data received via the connection 11 directly to the memory 8 via the connection 9. However, if the frame is chosen to be larger, the part of the auxiliary image which is defined thereby must be reproduced at a reduced scale on the display screen 1, 2, because the dimensions of the display screen do not change. This reduction is performed by averaging in the processing unit 10, preferably by weighted averaging of the data supplied via the connection 11. In principle it is also possible to reduce the frame. In that case the part of the image must be reproduced in a scale which is larger than the value corresponding to the data stored in the memory 12, i.e. the processing unit 10 must generate additional image data (preferably by interpolation).

A change of the order of the images in the group of images stored in the memory 12 relative to one another upon reproduction in the auxiliary image 4, or a shift of an image can be realized by transferring the image data to the memory 12. However, it is alternatively possible for the processing unit to recalculate merely the addresses via which the memory 12 is addressed, via the connection 13, so as to determine therefrom the reduced reproduction of the entire group of images in the auxiliary image 4. These two possibilities exist in principle also if one of the images of the group of images stored in the memory 12 must be reproduced at an enlarged or reduced scale, or when an image is to be reproduced in a mirrored fashion or with a changed or rotated orientation. Modification of the halftone reproduction, notably an increase of the halftone differences in an image, often requires a rather complex calculation which may require an intermediate or buffer memory which is provided, for example in the processing device 10. The appropriate control instructions for such image manipulations are entered via the input unit 14.

The processing unit 10 is preferably formed by a computer, the image memory 8 then being formed by the main memory of the computer. Such known computers also include a control unit 6 for controlling at least one display screen, so that the device shown in FIG. 1 can be formed by a universal computer, the memory 12 then being formed, for example, by the hard disk memory of such a computer.

Figure 2:
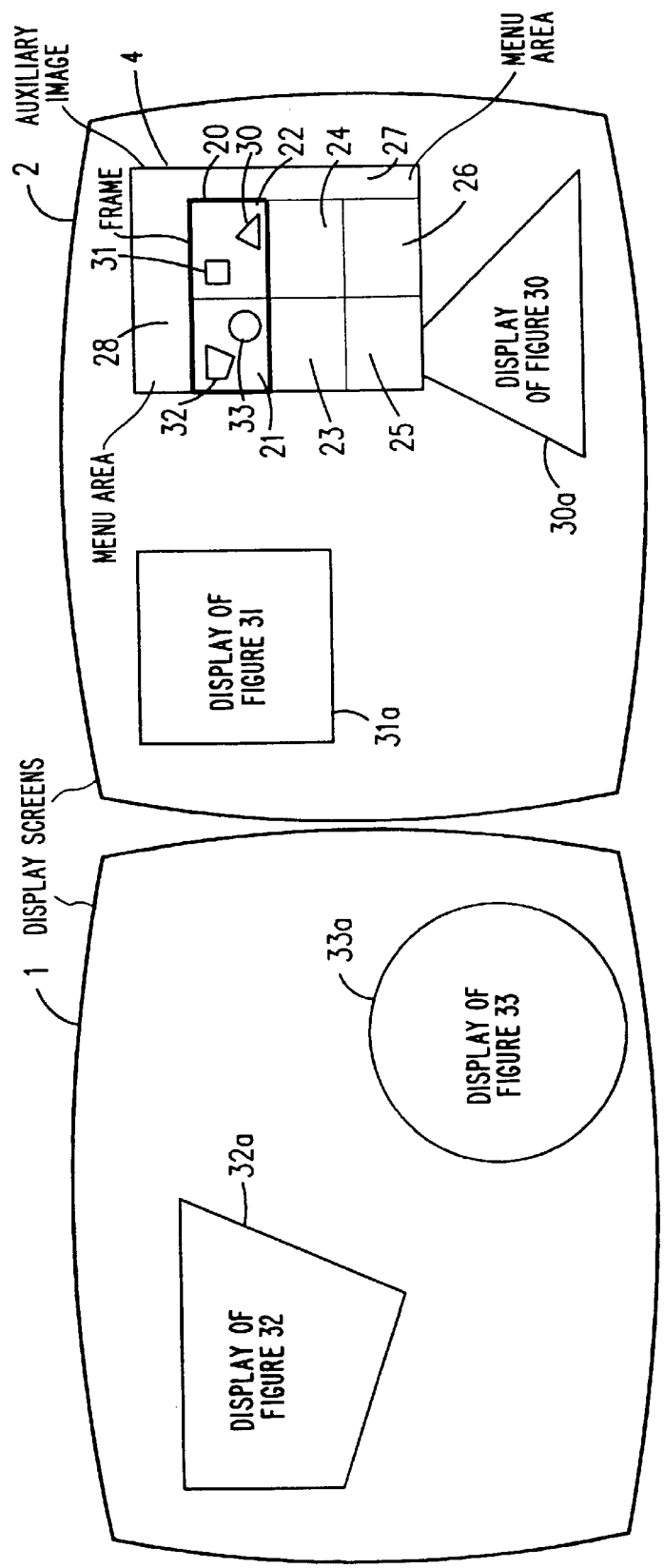
FIG. 2 illustrates the display of the image and the auxiliary image with the frame on a display screen.

FIG. 2 illustrates the display of two images on the display screens 1, 2. On the display screen 2 an auxiliary image 4 is reproduced as a window which shows a complete group of images at a reduced scale. This auxiliary image is shown to be larger in FIG. 2 than it actually occurs in practice. The auxiliary image 4 shows a group of images which is subdivided into six fields 21 to 26; for the sake of clarity only FIGS. 30 to 33 are indicated in the fields 21 and 22, said figures representing the image content of two images in each field. Each field 21 and 22 thus contains a sub-group consisting of two images, each with one figure which itself can be changed, shifted or otherwise manipulated.

The sub-groups 21 and 22 are enclosed by a frame 20 which is reproduced on the display screen in a clearly visible manner, for example as a wide band or in color. The images or figures situated within this frame are displayed at an enlarged scale on the display screens 1 and 2, i.e. the FIG. 32 is displayed as the FIG. 32*a* on the display screen 1 and the FIG. 33 as the FIG. 33*a*. Similarly, the FIGS. 30 and 31 are displayed as the FIGS. 30*a* and 31*a* on the display screen 2. The FIG. 30*a* is not shown completely, because a small part of it is masked by the window 4.

The fields 21 to 26 do not completely fill the auxiliary image 4, since above and to the right of the images there are provided menu areas 27 and 28. Via a mark on the display screen, which can be moved across the display screen in known manner by means of a mouse, a pair of fields can be selected in the menu area 27. Manipulations can be performed on the images situated in the fields thus selected, said manipulations being selected from the menu area 28, for example by means of the mouse. Similarly, the frame 20 can also be shifted or in this case reduced in the auxiliary image. When the window 20 is adjusted to the fields 23 and 24, the figures contained in the associated images (not shown in FIG. 2 for the sake of clarity) are displayed on the display screens 1 and 2. Because each of the FIGS. 30, 31 is associated with an image and can be manipulated per se, the individual images can be selected and shifted, by means of the mouse, either in the auxiliary image 4 or in the large-size reproduction on the display screens; for example, the image with the FIG. 30 can be shifted out of the field 22, or the figure can be rotated, mirrored or its scale or its halftones can be changed. The various possibilities can be selected at least partly from the menu area 28. Furthermore, it is also possible to erase images or sub-groups of images and to add new images, the auxiliary image 4 becoming smaller proportionally upon erasure of images whereas it will occupy a correspondingly larger area on the display screen 2 in the case of addition of images.

Any change in the auxiliary image 4 and also any manipulation of an image becomes visible not only in the auxiliary image 4, but at the same time also at full scale on the display screens 1 and 2. This enables very distinct display of individual images or sub-groups of images from a group of images and also their processing, because the auxiliary image shows at all times which images from the group of images are displayed on the overall display screen 1, 2 and with which manipulations.

Direct processing of the images displayed on the overall display screen 1, 2 is also possible; in that case the corresponding images in the auxiliary image, i.e. the images situated within the frame, are then automatically modified in the same way.

We claim:

1. A method for the display of one or more neighboring images from a group of images on at least one display screen, the image data of the group of images being stored and displayed as an auxiliary image at a reduced scale factor on the display screen or on one of the display screens, the size of the auxiliary image being determined only by the magnitude of the group of images and the reduced scale factor in conformity with the image data stored for said group, a sub-display in the form of a frame being reproduced within the auxiliary image, the position and dimensions of said frame in the auxiliary image being modifiable by externally applied first control instructions, the part of the group of images which is situated within the frame in the auxiliary image always being displayed as the image on the display screen or the display screens, with the exception of only the area of the auxiliary image, and the order and/or the reproduction of at least some images of the group of images being modifiable under the control of externally applied third control instructions, any modification of an image also taking place automatically in the auxiliary image and vice versa.

2. A method as claimed in claim 1, characterized in that the the group of images can be altered by addition or erasure of images under the control of externally applied second control instructions, the size of the auxiliary image being automatically determined by the magnitude of the altered group of images and the reduced scale factor.

3. A method as claimed in claim 1, characterized in that the dimensions and/or the position of the frame can be changed only in steps which comprise a plurality of pixels on the display screen.

4. A method as claimed in claim 1, characterized in that the image is displayed in reduced scale or an increased scale, depending on the dimensions of the frame relative to the auxiliary image and on the image data determining the resolution of the group of images.

5. A method for displaying one or more images on a logical display surface comprising:

selecting a plurality of images for inclusion in a group of selected images from images present in one or more image memories, said selection being responsive to input control instructions, displaying on the logical display surface as an auxiliary image said group of selected images at a reduced scale factor, the size of said auxiliary image being determined by the magnitude of said group of selected images and the reduced scale factor, the position of said auxiliary image being responsive to input control instructions, displaying within said auxiliary image a frame having a size and position responsive to input control instructions, and displaying on the logical display surface those image of said group of selected images that are within said frame, said displaying at a scale factor determined by the relation of the size of logical display surface, the size of those images of said group of selected images within said frame, and the resolution of the images.

6. The method of claim 5 wherein said logical display surface comprises two display screens, and wherein said auxiliary image is displayed on only one of said display screens.

7. The method of claim 5 further comprising shifting within said auxiliary image one or more chosen images of said group of selected images, said choosing and shifting according to input control instructions, and shifting in a corresponding manner within the logical display surface those chosen images which were shifted in said auxiliary image in said immediately previous shifting step and which are also displayed on the logical display surface.

8. The method of claim 5 further comprising shifting within the logical display surface one or more chosen displayed images, said choosing and shifting according to input control instruction, and shifting in a corresponding manner within said auxiliary image those chosen images which were shifted in said immediately previous shifting step.

9. The method of claim 5 further comprising performing within said auxiliary image on one or more of the images of said group of selected images one or more operations of rotation, mirroring, scale changing, or halftone changing, said performing according to input control instructions, and performing corresponding operations within the logical display surface on those images which were subject to operations in said auxiliary image in said immediately previous performing step and which are also displayed on the logical display surface.

10. The method of claim 5 further comprising performing within the logical display surface on one or more of the displayed images one or more operations of rotation, mirroring, scale changing, or halftone changing, said performing according to input control instruction, and performing corresponding operations within said auxiliary image on those images which were subject to operations in said immediately previous performing step.

11. The method of claim 5 further comprising altering said group of selected images by either adding additional images selected from images present in the one or more image memories to said group of selected images, or by erasing selected images from said group of selected images, said altering according to input control instructions, and displaying on the logical display surface said altered group of selected images as an altered auxiliary image having a size determined by the magnitude of the altered group of selected images and the reduced scale factor, wherein the display of said frame is not changed.

12. The method of claim 5 wherein said displaying said group of selected images displays images from said group of selected images in said auxiliary image in an order dependent on one or more attributes associated with the selected images, said order being responsive to input control instructions.

13. The method of claim 5 wherein said auxiliary image further comprises a plurality of menu areas for the selection of operations and a plurality of fields for the display of images from said group of selected images.

14. The method of claim 5 wherein the size and position of said frame within said auxiliary image changes only by steps, each step comprising a fixed number of pixels.

15. A device for displaying one or more images comprising one or more display screens, an image memory for storing image data to be displayed, a control unit for converting the image data from said image memory into device control signals for said one or more display screens, one or more second memories for storing image data representing images to be displayed, a processing device which includes an input unit for the input of control instructions, said processing device being configured to perform the following operations selecting a plurality of images for inclusion in a group of selected images from images present in said one or more second memories, said selecting being responsive to input control instructions, writing into said image memory auxiliary image data representing an auxiliary image, said auxiliary image data comprising image data representing images in said group of selected images at a reduced scale factor, the size of said auxiliary image on said one or more display screens being determined by the magnitude of said group of selected images and the reduced scale factor, the position of said auxiliary image on said one of more display screen being responsive to input control instructions, writing into said image memory frame image data representing a frame, said frame being displayed within said auxiliary image and having a size and position that is responsive to input control instructions, and writing into said image memory regular image data comprising image data representing those images of the part of said group of selected images that is within said frame, said regular image data being at a scale factor determined by the combined size of the one or more display screens, the size of the part of said group of selected images within said frame, and the resolution of the images.

16. The device of claim 15 wherein said processing device is further configured to perform the following operations altering said group of selected images either by adding additional images selected from images present in said one or more second memories to the group of selected images, or by erasing selected images from the group of selected images, said altering according to input control instructions, and writing into said image memory altered auxiliary image data representing an altered auxiliary image, said altered auxiliary image data comprising image data representing images in said altered group of selected images at a reduced scale factor, the size of said altered auxiliary image on said one or more display screens being determined by the magnitude of said altered group of selected images and the reduced scale factor.

17. The device of claim 15 wherein said processing device is further configured to perform the following operations shifting image data within said auxiliary image in said image memory, said shifted image data representing one or more chosen images of said group of selected images, said choosing and shifting according to input control instructions, and shifting in a corresponding manner image data within said regular image data in said image memory, said shifted image data within said regular image data representing those images which were shifted in said auxiliary image in said immediately previous shifting operation and which are also displayed on said one or more display screens.

18. The device of claim 15 wherein said processing device is further configured to perform the following operations shifting image data within said regular image data in said image memory, said shifted image data representing one or more chosen displayed images, said shifting according to input control instruction, and shifting in a corresponding manner image data within said auxiliary image data in said image memory, said shifted image data within said auxiliary image data representing those images which were shifted in said immediately previous shifting step.

19. The device of claim 15 wherein the image data comprises pixels, and wherein the processing device determines image data to be written into said image memory at a reduced or an increased scale factor by averaging over pixels or by interpolating between pixels, respectively.

* * * * *